(12) United States Patent
Lau

(10) Patent No.: US 7,721,882 B2
(45) Date of Patent: May 25, 2010

(54) DISK PROTECTIVE ENCLOSURE

(75) Inventor: Kwok Din Lau, Hong Kong (CN)

(73) Assignee: Finest Products Limited, Hong Kong (CN)

( * ) Notice: Subject to any disclaimer, the term of this patent is extended or adjusted under 35 U.S.C. 154(b) by 647 days.

(21) Appl. No.: 11/465,745

(22) Filed: Aug. 18, 2006

(65) Prior Publication Data

US 2008/0041743 A1  Feb. 21, 2008

(51) Int. Cl.
B65D 85/57 (2006.01)
(52) U.S. Cl. ................. 206/308; 206/308.1; 206/493
(58) Field of Classification Search ............... 206/310, 206/308.1, 303, 493, 307, 309, 312; 211/40, 211/41.12
See application file for complete search history.

(56) References Cited

U.S. PATENT DOCUMENTS

| | | | |
|---|---|---|---|
| 5,400,902 A | 3/1995 | Kaminski | |
| 5,494,156 A | 2/1996 | Nies | |
| 5,526,926 A | 6/1996 | Deja | |
| 5,586,651 A | 12/1996 | Krummenacher | |
| 5,727,680 A | 3/1998 | Liu | |
| 5,944,181 A * | 8/1999 | Lau | 206/308.1 |
| 6,065,594 A | 5/2000 | Sankey et al. | |
| 6,123,192 A | 9/2000 | Rufo, Jr. | |
| 6,170,656 B1 * | 1/2001 | Cerda-Vilaplana et al. | 206/308.1 |
| 6,196,384 B1 | 3/2001 | Belden, Jr. | |
| 6,237,763 B1 * | 5/2001 | Lau | 206/308.1 |
| 6,364,108 B1 | 4/2002 | Bin | |
| 6,425,481 B1 | 7/2002 | Choi | |
| 6,427,833 B1 | 8/2002 | Hui | |

(Continued)

FOREIGN PATENT DOCUMENTS

AU  2003229251 A  11/2004

(Continued)

OTHER PUBLICATIONS

PCT International Search Report, mailing date Nov. 8, 2007 (Aug. 18, 2006); International application No. PCT/CN2007/070510; International Filing date Aug. 17, 2007; (Earliest) Priority date Aug. 18, 2006.

(Continued)

*Primary Examiner*—David T Fidei
(74) *Attorney, Agent, or Firm*—Danton K. Mak; Sheldon Mak Rose & Anderson PC

(57) ABSTRACT

A holder for a disk having a central opening includes a base, a forwardly projecting ring for supporting the disk, a diaphragm supported within the ring member, and a button structure projecting forwardly from the diaphragm for engaging the central opening. Retainer members project radially outwardly from the central opening proximate the front face surface for releasably holding the disk when the diaphragm member is in a relaxed position. Downward pressure on the button structure deflects the diaphragm to move the retainer members inwardly for releasing the disk. The retainer members are on hook stem members that are rigidly joined to an inner extremity of the diaphragm in radial alignment with circumferentially spaced ring attachment locations of the diaphragm. Button stem members rigidly connect a button member to the diaphragm in alternating circumferentially spaced relation to the hook stem members to provide greatly enhanced lateral support of the disk.

12 Claims, 4 Drawing Sheets

U.S. PATENT DOCUMENTS

| | | | |
|---|---|---|---|
| 6,554,132 B2 | 4/2003 | Lau | |
| 6,672,455 B2 | 1/2004 | Belden, Jr. et al. | |
| 6,719,133 B2 | 4/2004 | Perez et al. | |
| 6,729,469 B1* | 5/2004 | Yau et al. | 206/308.1 |
| 6,752,266 B2 | 6/2004 | Ku | |
| 6,799,679 B2 | 10/2004 | Hui | |
| 6,874,625 B2 | 4/2005 | Chang | |
| 6,929,123 B2* | 8/2005 | Lau | 206/308.1 |
| 6,951,278 B2 | 10/2005 | Pettigrew et al. | |
| 6,983,842 B2* | 1/2006 | Krummenacher | 206/308.1 |
| 2001/0047947 A1* | 12/2001 | Lau | 206/310 |
| 2002/0011426 A1 | 1/2002 | Byrne et al. | |
| 2002/0112974 A1 | 8/2002 | Lau | |
| 2003/0015441 A1 | 1/2003 | Kang et al. | |
| 2003/0034258 A1* | 2/2003 | Lee | 206/308.1 |
| 2003/0034259 A1* | 2/2003 | Lopez mas | 206/308.2 |
| 2003/0070946 A1* | 4/2003 | Liu | 206/310 |
| 2003/0168361 A1 | 9/2003 | Lau | |
| 2003/0196918 A1 | 10/2003 | Lau | |
| 2004/0129587 A1* | 7/2004 | Lax et al. | 206/308.2 |
| 2004/0144663 A1* | 7/2004 | Chang | 206/310 |
| 2004/0173481 A1 | 9/2004 | Choi et al. | |
| 2004/0178091 A1* | 9/2004 | Lau | 206/308.1 |
| 2005/0098453 A1 | 5/2005 | Lax | |
| 2005/0173273 A1 | 8/2005 | Marsilio et al. | |
| 2005/0269223 A1 | 12/2005 | Wawrzynowski | |
| 2005/0279143 A1 | 12/2005 | Belden, Jr. et al. | |
| 2005/0279657 A1 | 12/2005 | Bjerregaard et al. | |
| 2006/0191809 A1 | 8/2006 | Heuser et al. | |
| 2006/0201831 A1* | 9/2006 | Hu | 206/310 |
| 2007/0102310 A1 | 5/2007 | Osborn et al. | |
| 2007/0138039 A1* | 6/2007 | Kirtz et al. | 206/308.1 |
| 2007/0193898 A1 | 8/2007 | Hu | |
| 2007/0215498 A1 | 9/2007 | Barnette et al. | |

FOREIGN PATENT DOCUMENTS

| | | |
|---|---|---|
| CN | 2418106 Y | 2/2001 |
| CN | 2466763 Y | 12/2001 |
| CN | 2624347 Y | 7/2004 |
| JP | 2002019871 A | 1/2002 |
| JP | 2004182315 A | 8/2004 |
| JP | 2005035664 A | 2/2005 |
| WO | WO2005019065 A | 3/2005 |

OTHER PUBLICATIONS

Office Action for U.S. Appl. No. 11/456,502, mailed Aug. 18, 2008, 18 pages.

Office Action for U.S. Appl. No. 11/465,687, mailed Oct. 28, 2008, 19 pages.

Office Action for U.S. Appl. No. 11/456,502, mailed Apr. 29, 2009, 16 pages.

Final Office Action for U.S. Appl. No. 11/465,687, mailed Apr. 29, 2009, 12 pages.

PCT International Search Report (mailing date Dec. 27, 2007); PCT/CN2007/070508; International Filing Date: Aug 17, 2007; (Earliest) Priority Date Aug. 18, 2006); Applicant, Finest Products Limited et al.

* cited by examiner

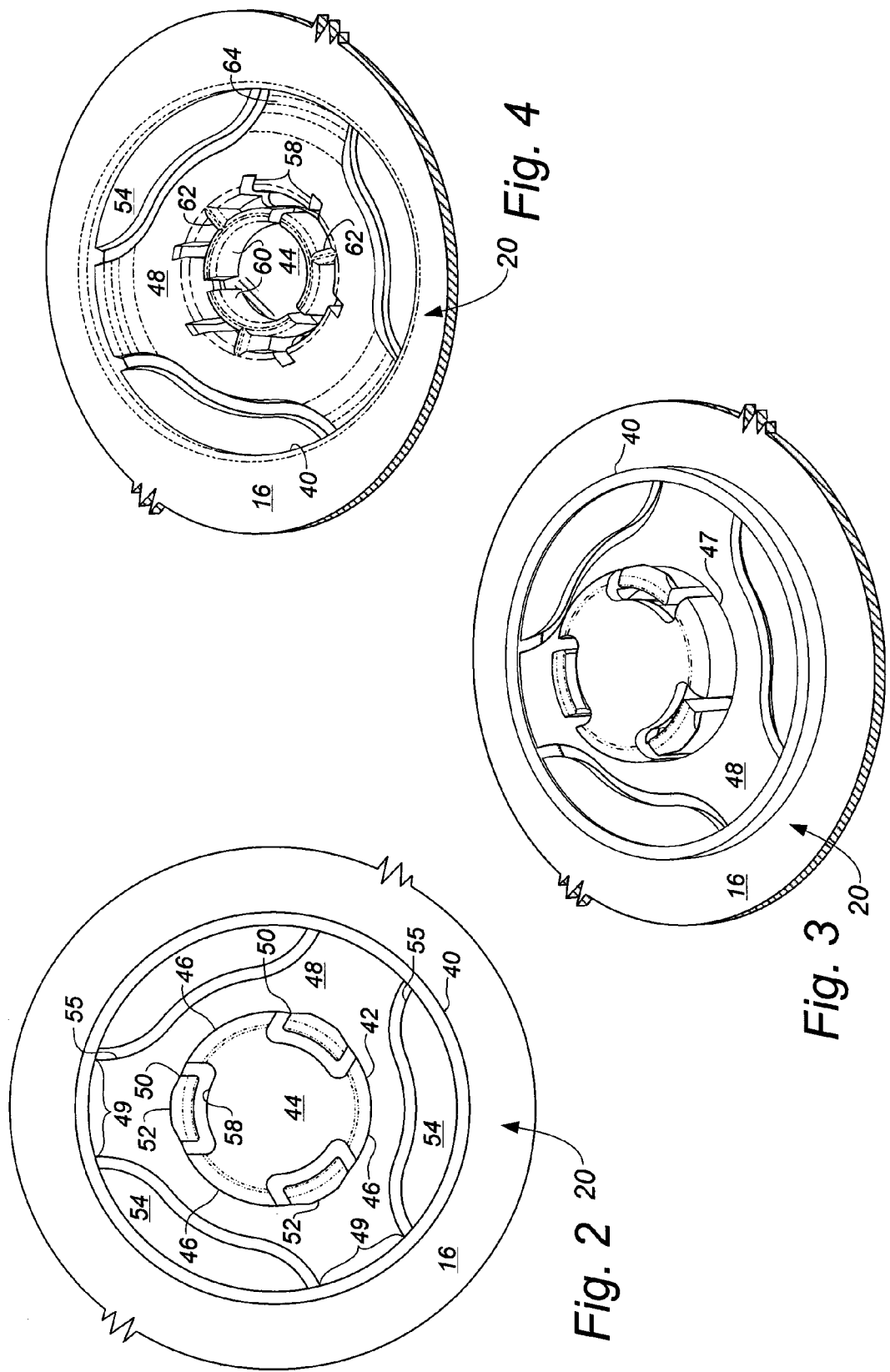

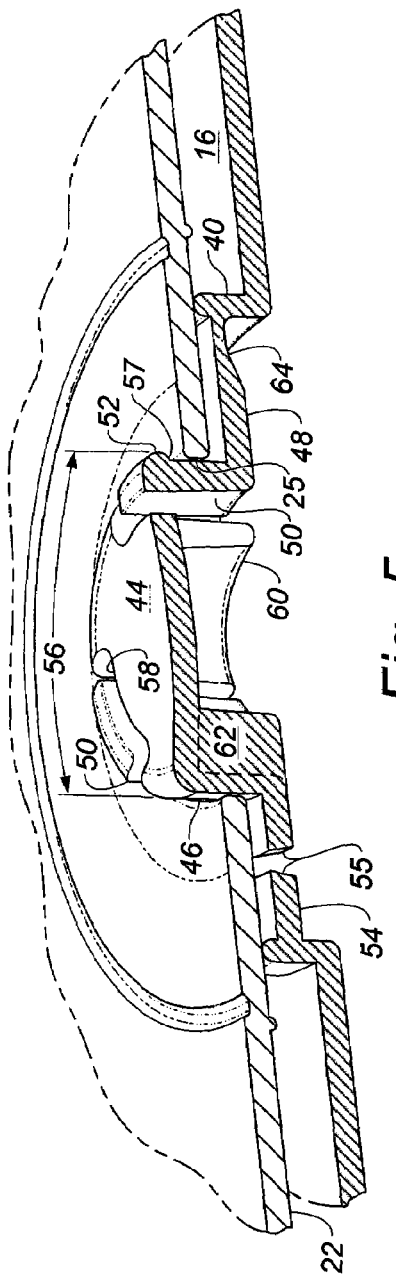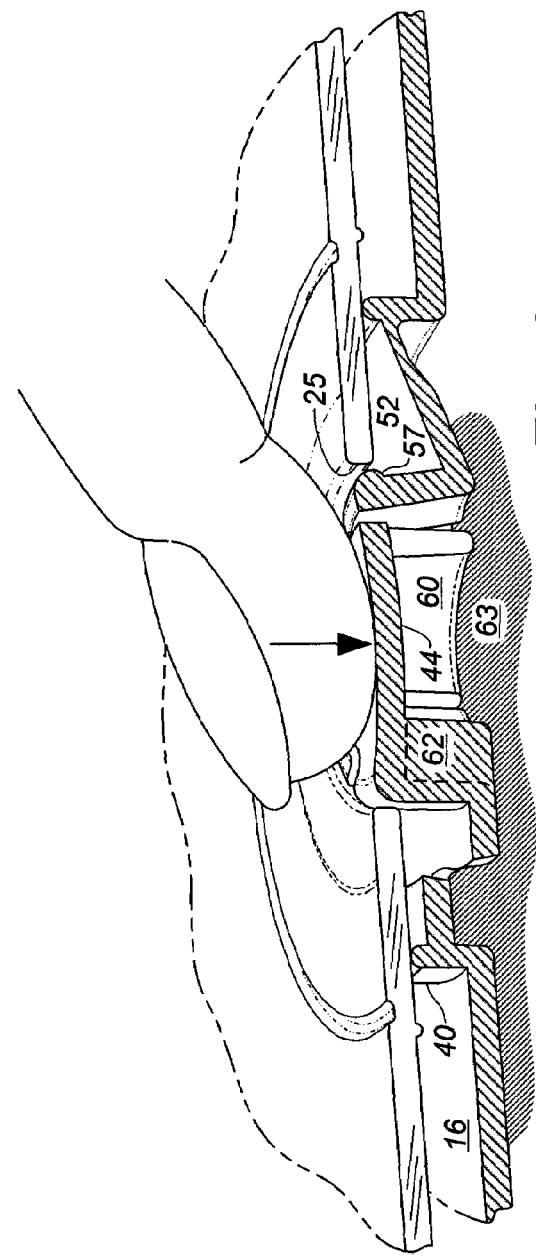

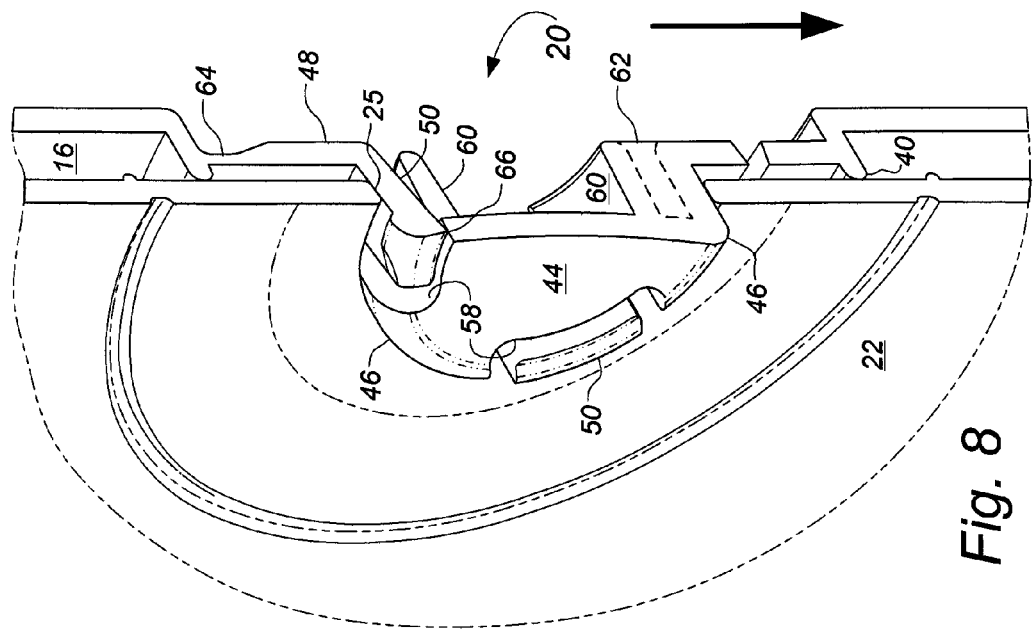
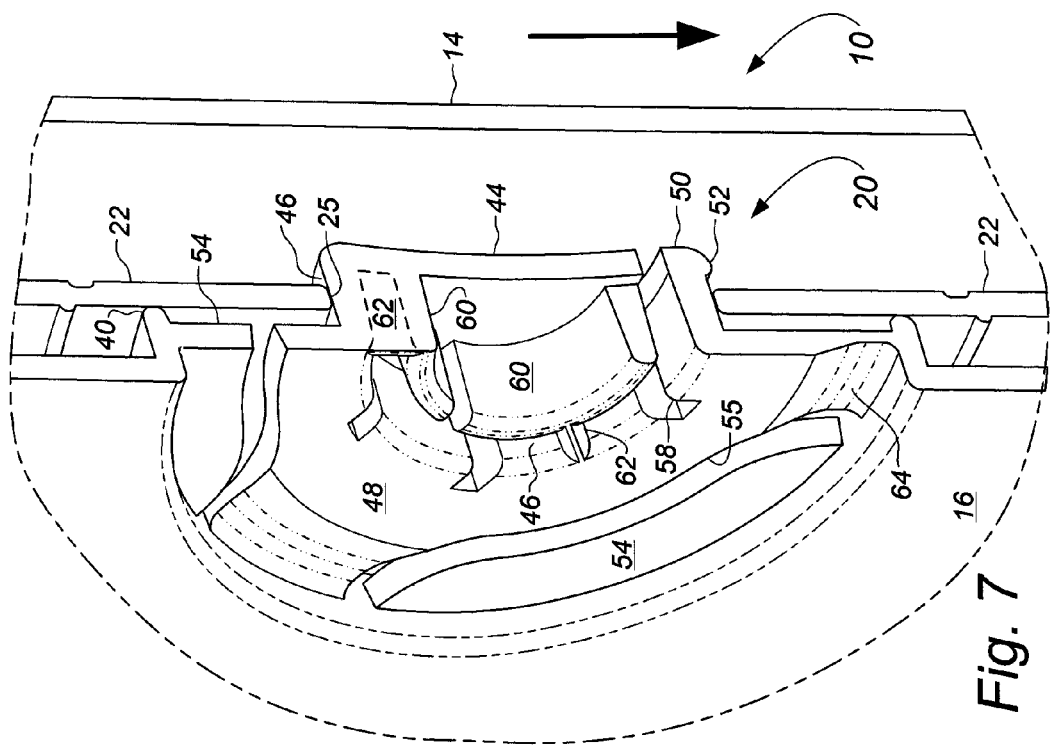

DISK PROTECTIVE ENCLOSURE

BACKGROUND

The present invention relates to optical data disks such as compact disks (CDs) and video disks (DVDs) that have central circular locating openings, and more particularly to devices for holding and/or protectively enclosing such disks for storage of same.

Data disks such as compact disks and video disks typically have large amounts of digitally stored information that is optically readable through a transparent bottom layer of the disk by a movable head during rotation of the disk. The information is arranged in one or more tracks that are covered by a thin protective top layer of the disk that can have labeling applied thereto such as by silkscreening. Normal handling of the disk can result in scratching of the bottom layer, resulting in loss of data by interference with the optical path such as by loss of focus and/or lateral image displacement. Also, data can be lost by scratching of the protective layer which is typically very thin, on the order of 20 microns, resulting in removal of information from a vapor deposited metal layer that is only about 0.1 micron thick. Protective containers for the disks in common use have a central pedestal for supportively gripping the disc by engaging the central opening without contacting either side of the disk within data-containing regions thereof. Such containers typically have a ledge for contacting portions of an outer perimeter of the disk for stabilizing the disk against tipping on the pedestal. The disk is loaded into the container by lowering it onto the pedestal while gripping opposite perimeter portions, engagement with the pedestal being typically effected by simultaneous finger pressure against the disk proximate the central opening. Removal of the disk is similarly effected by finger pressure against the pedestal and simultaneous lifting at the perimeter portions.

Disk holders and containers of the prior art typically exhibit one or more of the following disadvantages:

1. They are ineffective in that the disk can easily become disengaged from the pedestal in normal and/or expected handling of the device;
2. They have structural components that are likely to be snagged or damaged during normal use and handling;
3. They are difficult to operate as to engagement and/or disengagement of the disk; and
4. They are excessively complex, involving high tooling costs, expensive quality control, and/or high rejection rates in production.

Thus there is a need for a protective disk container that overcomes at least some of the disadvantages of the prior art.

SUMMARY

The present invention meets this need by providing a molded disk holder wherein structural components are unlikely to be snagged or damaged during normal use and handling, and that is particularly effective, inexpensive to produce, and easy to use. In one aspect of the invention, the holder includes a base; a pedestal projecting forwardly from the base on a pedestal axis, the pedestal including a ring structure projecting forwardly from the base for contacting the rear face surface of the disk for supporting the disk axially forwardly relative to the base; a diaphragm member supported within the ring member in proximate parallel relation to the base and having a relaxed position being in raised relation to the outside surface portion of the base portion; and a button structure projecting forwardly from the diaphragm member for engaging the central opening and having retainer members projecting radially outwardly from the central opening proximate the front face surface for releasably holding the disk when the diaphragm member is in the relaxed position, the diaphragm member deflecting axially rearwardly to a depressed position in response to applied pressure against the button structure with sufficient radially inward and axially rearward movement of the retainer members to permit passage of the retainer members through the central opening of the disk, thereby releasing the disk. The button structure can be configured for disk to be moved axially forwardly by the retainer members when the diaphragm member is allowed to return to the relaxed position by removal of the applied pressure subsequent to the passage of the retainer members through the central opening, thereby facilitating removal of the disk from the holder.

Preferably the button structure further includes a circumferentially spaced plurality of axially projecting stem members connecting the retainer members to the diaphragm member for lateral support of the disk. Preferably the button structure further includes a plurality of column members forwardly projecting from the diaphragm member and circumferentially spaced between the stem members, and a button member connecting the column members for receiving the applied pressure against the button structure for greatly enhanced lateral support of the disk. Preferably the button structure further includes a segment member projecting downwardly from the button member for limiting downward travel of the button member when the holder is resting on a supporting surface. Preferably each column member is reinforced by a bridge member connected to a corresponding inwardly spaced segment member. Further, or in the alternative, end extremities of each stem member are spaced from the button member by a button slot, inward deflection of the stem member being limited by contact with the button member.

The disk holder can also be incorporated in a container which includes a case having a hingedly connected base and a lid, the pedestal being on the base. The container can also include a generally rectangular spine portion that is hingedly connected along its opposite side extremities between the base and lid.

DRAWINGS

These and other features, aspects, and advantages of the present invention will become better understood with reference to the following description, appended claims, and accompanying drawings, where:

FIG. 2 is a top plan view of a pedestal portion of the case FIG. 1;

FIG. 3 is an upper perspective view of the pedestal portion of FIG. 2;

FIG. 4 is a lower perspective view of the pedestal portion of FIG. 2;

FIG. 5 is a sectional view on line 5-5 of FIG. 1;

FIG. 6 is as sectional view as in FIG. 5, showing a portion of the pedestal portion in a deformed condition;

FIG. 7 is a fragmentary oblique sectional perspective view showing impact loading of the pedestal portion of FIG. 2 in a first direction; and FIG. 8 is a fragmentary oblique sectional perspective view showing impact loading of the pedestal portion of FIG. 2 in an opposite second direction.

DESCRIPTION

Figure 1:
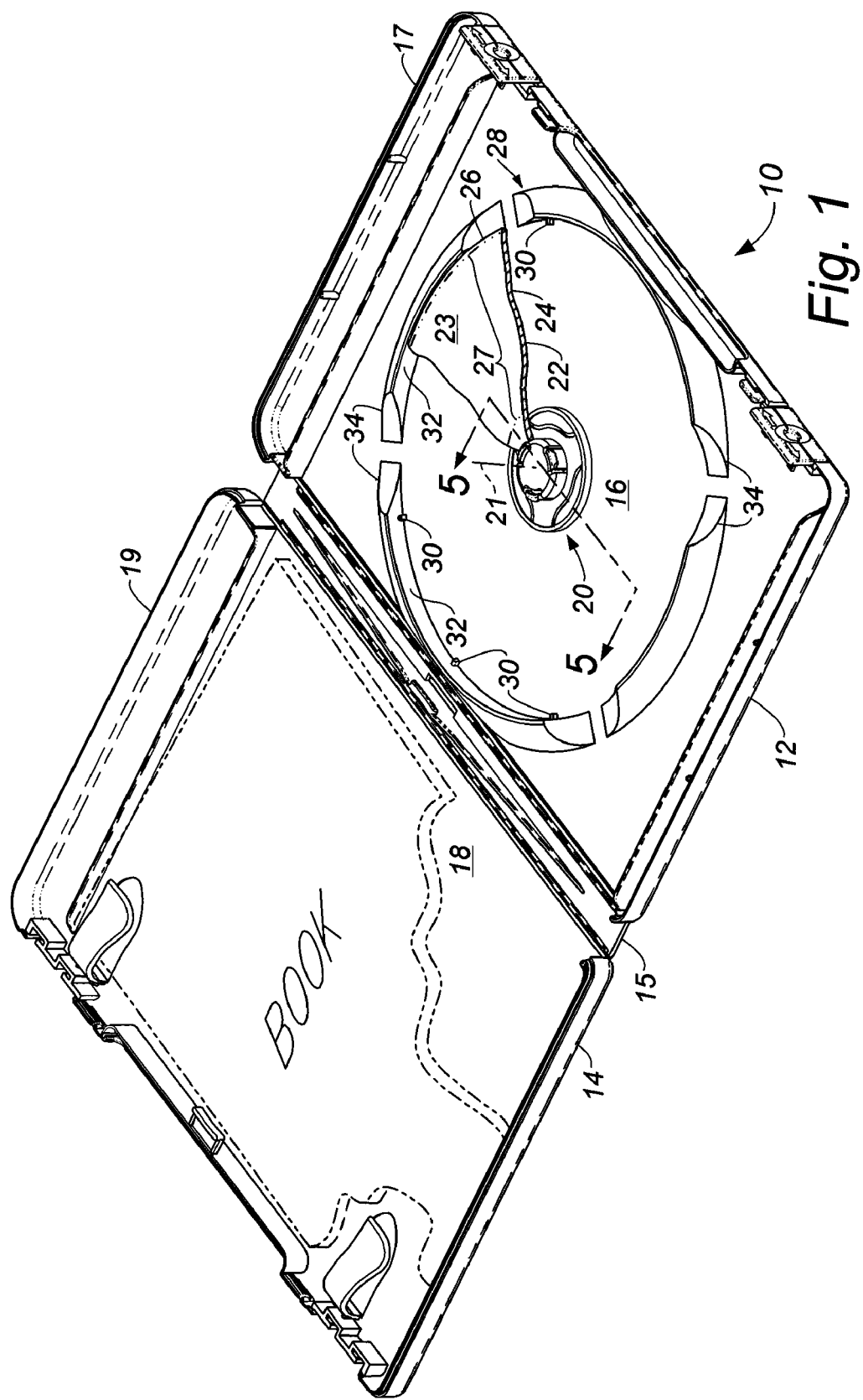
FIG. 1 is a perspective view of a protective disk case incorporating a holder according to the present invention, the case being in an open condition.

The present invention is directed to a disk holder, an exemplary embodiment being in the form of a container or case that is particularly effective for protectively storing disks such as CDS and DVDs. With reference to FIGS. 1-8 of the drawings, a protective disk case 10, which may have a transparent jacket (not shown) bonded thereto for displaying printed material, includes a base 12, a lid 14, and a spine 15 that movably connects the base and lid. In an exemplary configuration, the case 10 is an integrally formed molded member, so-called "living hinges" being formed along opposite edges of the spine 15. The base 12 and lid 14 include respective panel portions 16 and 18, and respective perimeter side portions 17 and 19 that snap together in overlapping adjacency in a closed condition of the case 10, the spine 15 and the side portions 17 and 19 together forming four side walls of the case 10, the lid panel portion 18 forming a front wall, the base panel portion 16 forming a rear wall. In further description of the case 10, the terms "front" and "forward" with respect to the base refer to a direction toward the lid 14 in the closed condition of the case 10; conversely, "rear", "rearward", and "back" refer to a direction away from the lid portion.

A hub or pedestal 20 of the case projects forwardly from the base panel portion 16 on a pedestal axis 21 for supportively engaging an optical data disk 22 having front and rear face surfaces 23 and 24, a circular central opening 25, and a periphery 26, a data region 27 of the disk extending inwardly from proximate the periphery and having an inside diameter somewhat greater than that of the central opening 25. An edge-support portion 28 of case 10 also projects forwardly on the base panel portion 16 in concentric relation to the pedestal axis 21 proximate the periphery 26 of the disk 22. The edge-support portion 28 is formed with a circumferentially spaced plurality of supports 30 for stabilizing the disk 22 against tipping, and a rim portion 32 that projects forwardly of the supports 30 for protecting the disk 22 proximate the periphery 26 while the disk is engaged with the pedestal 20. The edge-support portion is also formed with at least one pair of finger depressions 34 for permitting opposite perimeter portions of the disk 22 to be grasped by a user of the container 10, the rim portion 32 being interrupted by the finger depressions 34.

According to the present invention, the pedestal 20 includes a ring structure 40 for supporting the disk 22 in elevated relation to the base panel portion as best shown in FIG. 5. With particular reference to FIGS. 2-5, the pedestal 20 further includes a button portion 42 having a button member 44, and a plurality of column members, designated button stem members 46, downwardly extending from the button member for engaging the central opening 25. Lower extremities of the button stem members are connected to an inner extremity 47 of a diaphragm member 48, the diaphragm member extending outwardly and being supportively connected to spaced apart connection locations 49 within the ring structure 40. A further spaced plurality of hook stem members 50 are supported by the diaphragm member in circumferentially alternating relation to the button stem members and concentric with the pedestal axis 21. Each of the hook stem members 50 has an outwardly projecting retainer member 52 for holding the disk 22 proximate the ring structure 40. Also, the hook stem members 50 are circumferentially located in proximate radial alignment with the connection locations 49. As further shown in the drawings, the diaphragm member 48 is spaced away from the ring structure 40 between the connection locations 49, and a corresponding plurality of skirt members 54 project inwardly from the ring structure in proximate coplanar relation to the diaphragm member, respective skirt slots 55 separating the skirt members from the diaphragm member.

The button member 44 is adapted for receiving downwardly directed finger pressure to produce inward deflection of the retainer members 52 whereby the disk 22 is releasable from the pedestal 20 as shown in FIG. 6 and further described below. Also, upper surfaces of the stem members 46 and 50, and the retainer members 52 collectively form a button surface 56, the button surface being tapered upwardly and inwardly from outer extremities of the retainer members for facilitating concentric engagement of the disk 22. Further, rearwardly facing engagement surfaces 57 of the retainer members have outwardly and forwardly extending extremity portions for facilitating disengagement from the disk.

The button stem members 46 do not have retainer members or tab members, being integrally formed with the single button member; the button stem members preferably remain substantially at the same equal distance from the pedestal axis 21 when the retainer members 52 are inwardly deflected in response to the downwardly directed finger pressure, for maintaining the disk 22 proximately concentric with the pedestal axis when the disk is being released. The stem members 46 and 50 are circumferentially spaced apart, respective stem slots 58 being formed therebetween, the slots also providing clearance between the hook stem members 50 and the button member 44 to allow the inward deflection of the retainer members 52.

In a preferred exemplary configuration of the present invention, a circumferentially spaced plurality of ring segments 60 extend downwardly from the button member 44, being radially spaced inwardly from respective ones of the button stem members 46, a bridge member 62 being connected between each ring segment and the corresponding stem member 46 shown in FIG. 4. The combination of the ring segments 60 and the bridge members 62 greatly stiffen the stem members 46 in relation to the button member 44 for enhanced lateral strength and stability of the pedestal 20 in support of the disk 22. This feature is best shown in FIG. 7 wherein the central opening 25 of the disk 22 bears against one of the button stem members 46 during lateral impact loading in a first direction indicated by the arrow in FIG. 7, the button stem member being reinforced by the bridge member 62 in combination with the associated ring segment 60 and the button member 44, which is further supported relative to the diaphragm member 48 by others of the button stem members 46. Also, the ring segments 60 project sufficiently downwardly for limiting downward travel of the button member 44 when the case 10 is resting on a flat supportive surface 63.

FIG. 8 is similar to FIG. 7, but showing the lateral impact loading in an opposite second direction indicated by the arrow therein, the central opening 25 of the disk 22 bearing against one of the hook stem members 50. Inward deflection of the hook stem member 50 (whether resulting from the described impact loading or otherwise) is advantageously limited by contact with the button member 44 opposite the stem slot 58 as indicated at 66 in FIG. 8. It will be understood further that in the exemplary configuration of the pedestal 20 shown in the drawings, the deflection of the hook stem member 50 in response to the described impact loading is also limited by the support provided by an adjacent button stem member 46 in the manner described above in connection with FIG. 7.

As further shown in FIGS. 4-6, the diaphragm member 48 has thinned regions 64 proximate respective ones of the connection locations 49 for concentrating deformation of the diaphragm member proximate the ring structure 40. When the button member 44 is depressed as shown in FIG. 6, respective regions of the diaphragm member 48 tilt downwardly and inwardly between each connection location and the corresponding hook tab member, the retainer members 52 moving downwardly and inwardly as shown in FIG. 6, there being a substantially rigid connection between the hook stem members 50 and the diaphragm member 48. The hook stem members 50 collectively have a relaxed condition as shown in FIGS. 2-4, an engaged condition wherein the retainer members 52 project outwardly from the central opening when the disk 22 is supported on the ring structure 40 as shown in FIG. 5, and a flexed condition wherein the retainer members are deflected radially inwardly and axially downwardly from the relaxed position as shown in FIG. 6 in response to external downward pressure applied to the button member 44 sufficient to permit passage of the retainer members through the central opening 25 of the disk. The engaged condition differs from the relaxed condition only to the extent that the hook stem members 50 are an interference fit within the central opening of the disk 25. Typically the fit is "line-to-line" or slightly loose, that condition of the stem members also being shown in FIG. 5.

Although the present invention has been described in considerable detail with reference to certain preferred versions thereof, other versions are possible. For example, the case 10 can be configured for incorporating an additional pedestal 20 on the lid panel portion 18, and/or receiving disk-carrying trays, such as disclosed in U.S. Pat. No. 6,554,132 to the present inventor and pending application Ser. No. 11/182,541, entitled Disk Protective Enclosure, which was filed Jul. 15, 2005. Both disclosures are incorporated herein in their entirety by these references. In these examples, the lid panel portion functions as a base panel portion, and disk-carrying trays have equivalent structure. That is, instead of being part of the overall container for the disk, the holder can also be part of a removable tray for holding the disk, the tray being inside the container. Therefore, the spirit and scope of the appended claims should not necessarily be limited to the description of the preferred versions contained herein.

What is claimed is:

1. A holder for a disk having a central opening and front and back face surfaces, the holder comprising:
   (a) a base;
   (b) a pedestal projecting forwardly from the base on a pedestal axis, the pedestal including:
      (i) a ring structure projecting forwardly from the base for contacting the rear face surface of the disk for supporting the disk axially forwardly relative to the base;
      (ii) a diaphragm member supported within the ring member in proximate parallel relation to the base and having a relaxed condition being in raised relation to the outside surface portion of the base portion; and
      (iii) a button structure projecting forwardly from the diaphragm member for engaging the central opening and having retainer members projecting radially outwardly from the central opening proximate the front face surface for releasably holding the disk when the diaphragm member is in the relaxed position, the diaphragm member deflecting axially rearwardly to a depressed position in response to external applied pressure against the button structure with sufficient radially inward and axially rearward movement of the retainer members to permit passage of the retainer members through the central opening of the disk, thereby releasing the disk;
      (iv) a circumferentially spaced plurality of axially projecting stem members connecting the retainer members to the diaphragm member;
      (v) a plurality of column members forwardly projecting from the diaphragm member and circumferentially spaced between the stem members, and a button member connecting the column members for receiving the applied pressure against the button structure; and
      (vi) a segment member projecting downwardly from the button member for limiting downward travel of the button member when the holder is resting on a supporting surface.

2. The holder of claim 1, wherein the diaphragm member is connected to the ring member at connection locations in proximate radial alignment with the retainer members, the diaphragm member being spaced away from the ring structure between the connection locations.

3. The holder of claim 1, wherein the button structure is configured for moving the disk axially forwardly by the retainer members when the diaphragm member is allowed to return to the relaxed position by removal of the applied pressure subsequent to the passage of the retainer members through the central opening.

4. The holder of claim 2, wherein the button structure further comprises a circumferentially spaced plurality of axially projecting stem members connecting the retainer members to the diaphragm member.

5. The holder of claim 4, wherein the button structure further comprises a plurality of column members forwardly projecting from the diaphragm member and circumferentially spaced between the stem members, and a button member connecting the column members for receiving the applied pressure against the button structure.

6. The holder of claim 1, comprising a plurality of segment members inwardly spaced from corresponding ones of the column members, each column member being reinforced by a bridge member connecting the corresponding segment member.

7. The holder of claim 1, wherein an end extremity of each stem member is spaced from the button member by a button slot, inward deflection of the stem member being limited by contact with the button member.

8. A container comprising a case comprising a base and a lid, the base and the lid being hingedly connected for opening and closing the case, and the pedestal of claim 1.

9. The container of claim 8, further comprising a generally rectangular spine portion, the base and the lid being hingedly connected along opposite sides of the spine portion.

10. The holder of claim 1, wherein the diaphragm member is formed having thinned regions proximate the connection locations for concentrating deformation of the diaphragm member proximate the ring structure.

11. A container comprising a case comprising a base and a lid, the base and the lid being hingedly connected for opening and closing the case, and the pedestal of claim 1.

12. The container of claim 11, further comprising a generally rectangular spine portion, the base and the lid being hingedly connected along opposite sides of the spine portion.

* * * * *